United States Patent
Kawakami

(10) Patent No.: US 11,084,438 B2
(45) Date of Patent: Aug. 10, 2021

(54) POWER SUPPLY APPARATUS FOR VEHICLES

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Takafumi Kawakami, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/613,149

(22) PCT Filed: Apr. 26, 2018

(86) PCT No.: PCT/JP2018/016926
§ 371 (c)(1),
(2) Date: Nov. 13, 2019

(87) PCT Pub. No.: WO2018/211938
PCT Pub. Date: Nov. 22, 2018

(65) Prior Publication Data
US 2020/0094758 A1 Mar. 26, 2020

(30) Foreign Application Priority Data
May 17, 2017 (JP) .............................. JP2017-097976

(51) Int. Cl.
*B60L 1/00* (2006.01)
*B60L 3/00* (2019.01)
(Continued)

(52) U.S. Cl.
CPC ............ *B60R 16/033* (2013.01); *H02J 1/102* (2013.01); *H02J 7/342* (2020.01); *H02J 9/061* (2013.01); *H02J 9/068* (2020.01); *H02M 3/1584* (2013.01)

(58) Field of Classification Search
CPC ........ B60R 16/033; B60R 16/03; H02J 7/342; H02J 9/068; H02J 1/102; H02J 9/061;
(Continued)

(56) References Cited

U.S. PATENT DOCUMENTS 5,845,144 A * 12/1998 Tateyama .............. G06F 1/3203
712/1
2011/0156627 A1 6/2011 Nakamura et al.

FOREIGN PATENT DOCUMENTS

JP 2000-112538 A 4/2000
JP 2001-320836 A 11/2001
(Continued)

OTHER PUBLICATIONS

International Search Report, Application No. PCT/JP2018/016926, dated Jul. 10, 2018. ISA/Japan Patent Office.

*Primary Examiner* — Richard Tan
(74) *Attorney, Agent, or Firm* — Honigman LLP

(57) ABSTRACT

A power supply apparatus for vehicles includes a first power supply circuit that converts a voltage applied to a first conductive path and applies the resulting voltage to a second conductive path, and second power supply circuits that convert a voltage applied to the first conductive path and apply the resulting voltage to third conductive paths, and switch portions are provided respectively between the second conductive path and the third conductive paths. Control units switch switch portions off when at least one of the first power supply circuit and the second conductive path is not
(Continued)

in the predetermined abnormal state, and switch the switch portions on in the predetermined abnormal state.

8 Claims, 4 Drawing Sheets

(51) Int. Cl.
*H02G 3/00* (2006.01)
*B60R 16/033* (2006.01)
*H02J 7/34* (2006.01)
*H02J 9/06* (2006.01)
*H02J 1/10* (2006.01)
*H02M 3/158* (2006.01)

(58) Field of Classification Search
CPC .... H02J 1/084; H02J 2310/46; H02J 2207/20; H02J 2310/48; H02J 7/14; H02M 3/1584; H02M 2001/0009; H02M 3/156; H02M 1/32; H02M 2001/008; H02M 2001/325
USPC ........................................................ 307/10.1
See application file for complete search history.

(56) References Cited

FOREIGN PATENT DOCUMENTS

| | | |
|---|---|---|
| JP | 2001-352690 A | 12/2001 |
| JP | 2014-030281 A | 2/2014 |
| JP | 2015-154618 A | 8/2015 |
| JP | 2017-052446 A | 3/2017 |

* cited by examiner

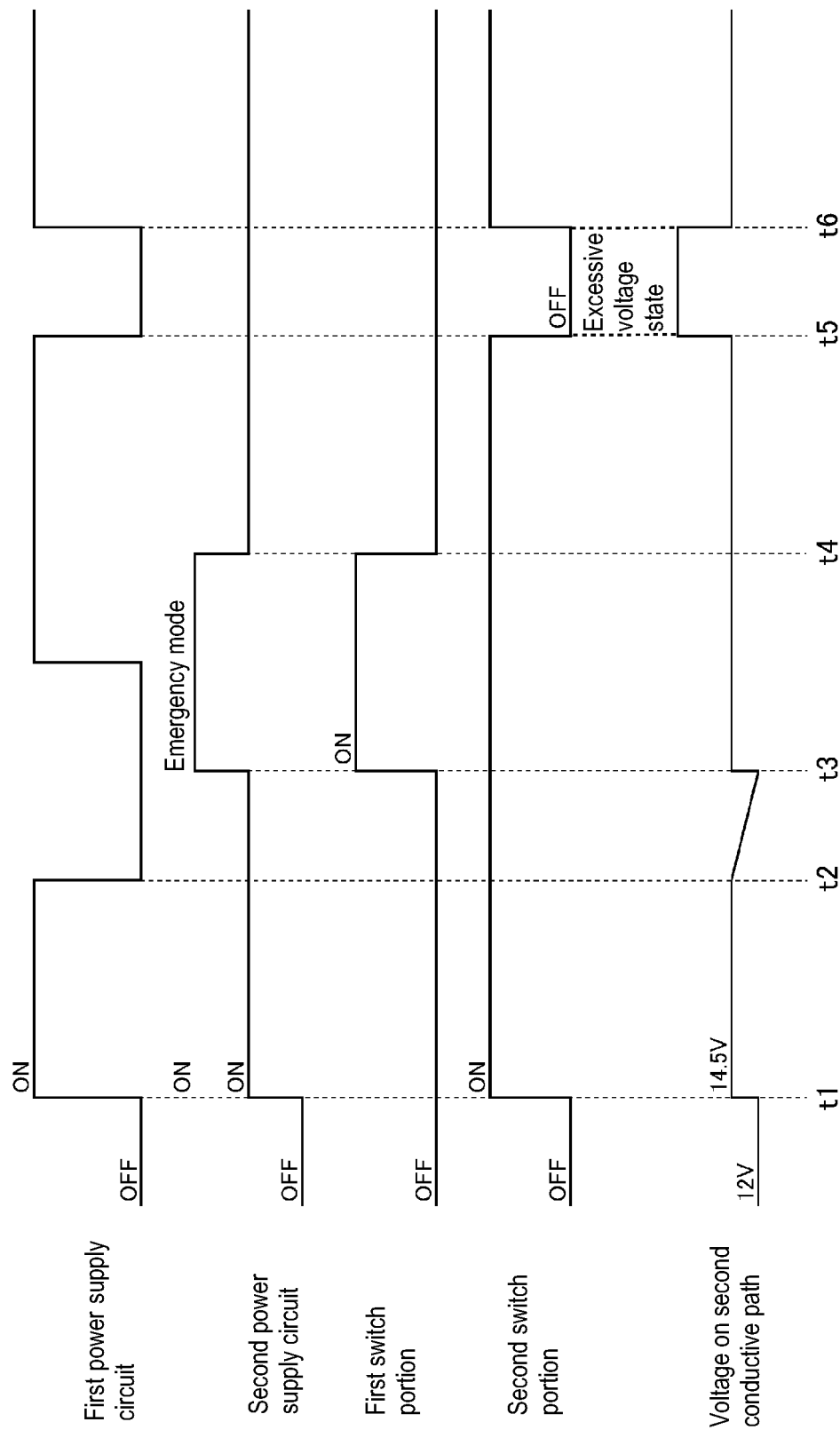

POWER SUPPLY APPARATUS FOR VEHICLES

CROSS-REFERENCE TO RELATED APPLICATIONS

This application is the U.S. national stage of PCT/JP2018/016926 filed on Apr. 26, 2018, which claims priority of Japanese Patent Application No. JP 2017-097976 filed on May 17, 2017, the contents of which are incorporated herein.

TECHNICAL FIELD

The present disclosure relates to a power supply apparatus for vehicles.

BACKGROUND

JP2001-352690A discloses an on-board power supply apparatus (power supply circuit) provided with a step-down circuit that can decrease a high voltage supplied from a power storage unit for vehicles (high voltage battery) and an alternator, and supply power to low-voltage loads and a second power storage unit (low-voltage battery). In this power supply circuit, the step-down circuit operates during a normal operation of the engine to decrease a high voltage that is output from the alternator, to a low voltage, power is supplied to the low-voltage loads, and its surplus power is stored in the second power storage unit (low-voltage battery).

Incidentally, in the power supply apparatus for vehicles (power supply circuit of the vehicle) disclosed in JP2001-352690A, the low-voltage loads are all electrically connected to the step-down circuit and the low-voltage battery, and thus, there is a problem in that, if a voltage decreases on this path for some reason, the supply voltage for all of the low-voltage loads decrease. In some of the loads mounted in the vehicle, a temporary significant change in the supply voltage is permitted, and, in others, it is desired not to change the supply voltage if at all possible. Regarding loads for which the stability of a supply voltage is more important, it is desired to secure a stable and independent supply path.

The present disclosure has been made in light of the above-described circumstances, and aims to realize a power supply apparatus for vehicles that can suppress influence that power supply has on a first load while stably supplying power to a second load, and can replenish power from a power supply path side corresponding to the second load to a power supply path side corresponding to the first load (supply power from a third conductive path side to a second conductive path side) when a predetermined abnormal state is entered.

Solution to Problem

A power supply apparatus for a vehicle that is a solution in the present disclosure includes a first conductive path that is a path through which power is supplied from a power storage unit for a vehicle, and a second conductive path that is a path electrically connected to one or more first loads, one or more third conductive paths that are paths electrically connected to one or more second loads that are different from the one or more first loads. A first power supply circuit converts a voltage applied to the first conductive path, and applies the resulting voltage to the second conductive path, one or more second power supply circuits that convert a voltage applied to the first conductive path and apply the resulting voltage to the one or more third conductive paths, at least one switch portion that is provided between the second conductive path and the one or more third conductive paths, and switches between an off-state where power supply from the third conductive path side to the second conductive path side is shut off and an on-state where it is permitted. A control unit switches the switch portion to the off-state when at least one of the first power supply circuit and the second conductive path is not in a predetermined abnormal state, and switches the switch portion to the on-state when the first power supply circuit and the second conductive path are in the predetermined abnormal state, and the second conductive path is electrically connected to a second power storage unit different from the power storage unit for a vehicle. A diode is provided in parallel with the switch portion, and an anode of the diode is connected to the second conductive path side and a cathode of the diode is connected to the third conductive path side, and when the control unit maintains the switch portion in the off-state, the anode of the diode and the second conductive path are electrically connected to each other, and the cathode and the third conductive path are electrically connected to each other.

Advantageous Effects of Disclosure

The above-described power supply apparatus for a vehicle includes a first power supply circuit that converts a voltage applied to a first conductive path that is a path through which power is supplied from a power storage unit for a vehicle, and applies the resulting voltage to a second conductive path, and one or more second power supply circuits that convert a voltage applied to the first conductive path, and applies the resulting voltage to a third conductive path. Due to such a configuration, power can be supplied to a first load via the second conductive path, and power can be supplied to a second load via the third conductive path.

In addition, a control unit operates so as to switch a switch portion to an off-state when at least one of the first power supply circuit and the second conductive path is not in a predetermined abnormal state, and switch the switch portion to an on-state when the first power supply circuit and the second conductive path are in the predetermined abnormal state. In this manner, when at least one of the first power supply circuit and the second conductive path is not in the predetermined abnormal state, the switch portion is switched to the off-state, and power supply from the third conductive path side to the second conductive path side is shut off, and thus, even if a temporary voltage decrease or the like occurs on the second conductive path, a current can be prevented from flowing in from the third conductive path side to the second conductive path side. Therefore, when the first power supply circuit and the second conductive path are not in the predetermined abnormal state, the state on the second conductive path side is unlikely to affect the third conductive path, and the state of the third conductive path is easily maintained in a stable manner.

On the other hand, in the predetermined abnormal state, the switch portion is switched to the on-state, and power supply from the third conductive path side to the second conductive path side is permitted. During a period when such an operation is performed, even if a voltage or a current decreases on the second conductive path side, power is compensated for from the third conductive path side, and the decrease in the voltage or current can be suppressed.

Furthermore, a configuration in which power can be supplied from the second power storage unit to a first load and a configuration in which the second power storage unit can be charged with power supplied from the first power supply circuit are achieved. With this configuration, when a charging voltage for the second power storage unit decreases, the first load is likely to be affected by the decrease, but a second load electrically connected to a third conductive path is unlikely to be affected by the decrease in the charging voltage.

Furthermore, in this power supply apparatus for a vehicle, when the control unit maintains the switch portion in the off-state, a current that is about to flow in from the third conductive path side to the second conductive path side is shut off, but a current that is about to flow in from the second conductive path side to the third conductive path side is permitted by the diode. Accordingly, even if a voltage that is applied to the third conductive path decreases significantly below a voltage that is applied to the second conductive path, the decrease in the voltage on the third conductive path is suppressed as a result of a current flowing in from the second conductive path to the third conductive path via the diode. Therefore, it is easier to stabilize the third conductive path, which is a path for supplying power to the second load.

BRIEF DESCRIPTION OF DRAWINGS

FIG. 4 is a timing chart illustrating temporal changes in the state of a first power supply circuit, the state of a second power supply circuit, the state of a switch portion (first switch portion), the state of a second switch portion, and a voltage in a second conductive path, in the power supply apparatus for vehicles of the first embodiment.

DETAILED DESCRIPTION OF PREFERRED EMBODIMENTS

Figure 1:
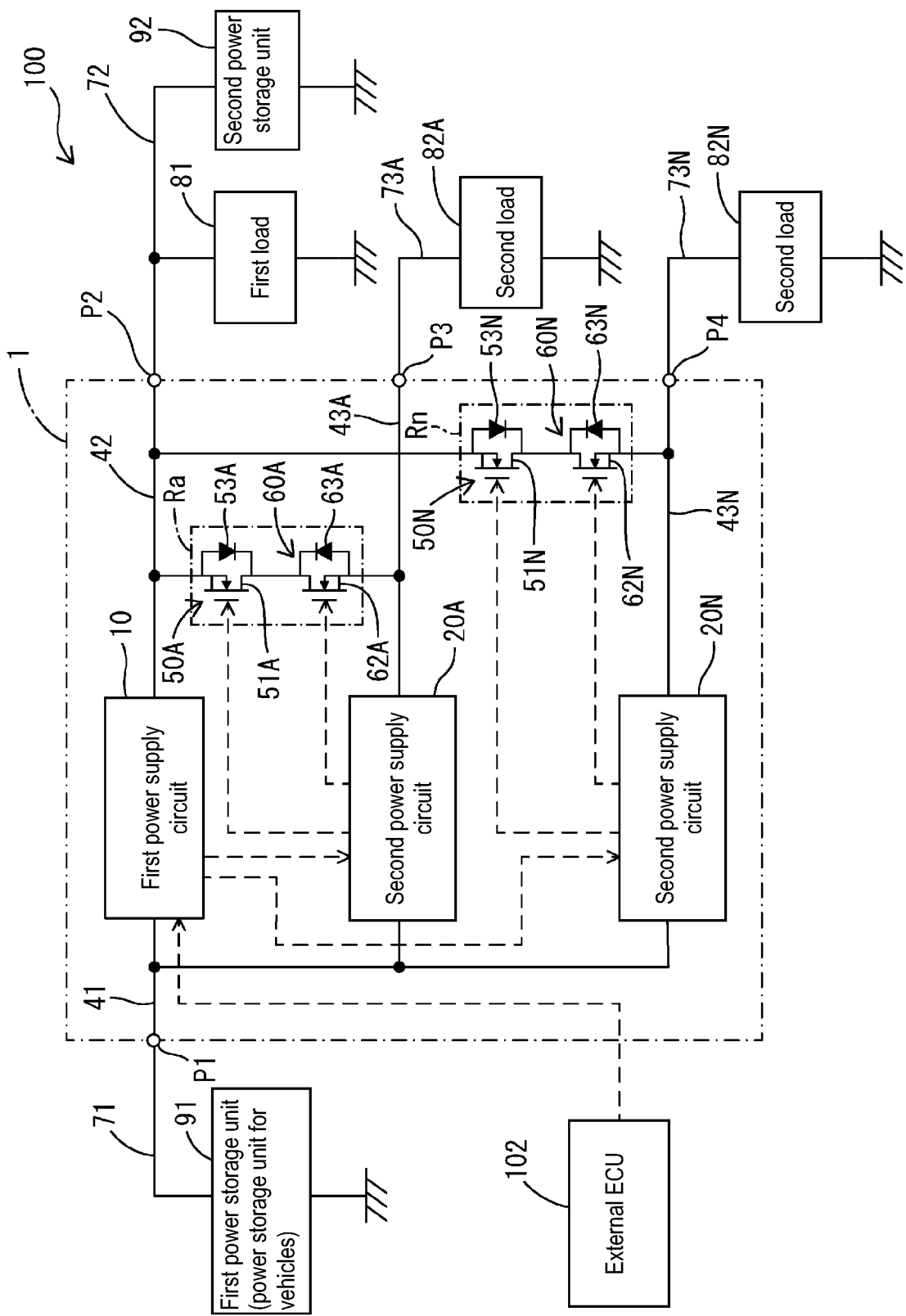
FIG. 1 is a circuit diagram schematically illustrating a power supply system for vehicles provided with a power supply apparatus for vehicles of a first embodiment.

Here, desirable examples of the present disclosure will be described.

In the power supply apparatus for a vehicle of the present disclosure may further include a detection unit that detects a value of a voltage that is applied to the second conductive path or a value of a current that flows through the second conductive path. The first power supply circuit may include a voltage conversion unit that converts a voltage applied to the first conductive path, and generates a voltage to be applied to the second conductive path, and a drive unit that drives the voltage conversion unit such that the value of the voltage that is applied to the second conductive path or the value of the current that flows through the second conductive path reaches a target value. The control unit may switch the switch portion to the on-state, taking as the predetermined abnormal state a state in which a value of a voltage or current detected by the detection unit is smaller than the target value by at least a certain value.

When a voltage or current on the second conductive path decreases to a certain degree, this power supply apparatus for a vehicle operates so as to switch the switch portion to the on-state and compensate for power from the third conductive path side to the second conductive path side. Therefore, even in a situation where a voltage or current on the second conductive path decreases to the certain degree, it is easy to suppress the decrease in the voltage or current on the second conductive path.

In the power supply apparatus for a vehicle of the present disclosure, a plurality of second power supply circuits, a plurality of third conductive paths, and a plurality of switch portions may be provided. In addition, the plurality of second power supply circuits may be respectively connected to the plurality of third conductive paths. The plurality of switch portions may be provided respectively between the second conductive path and the plurality of third conductive paths, and all of the switch portions may switch between the off-state where power supply from the corresponding third conductive path side to the second conductive path side is shut off and the on-state where it is permitted.

This power supply apparatus for a vehicle can supply power to second loads using the second power supply circuits, and it is easy to supply power to the second loads stably without being likely to be affected by a decrease in a voltage or current on the second conductive path side. On the other hand, in the predetermined abnormal state, the plurality of switch portions are switched to the on-state, and then power can be supplied from the third conductive path side to the second conductive path side. In this manner, when the predetermined abnormal state is entered on the second conductive path side, a plurality of paths for compensating for power are secured, and thus it is easy to supply power from the third conductive path side to the second conductive path side more reliably and more sufficiently.

The above-described power supply apparatus for a vehicle, in which the diode is provided in parallel with the switch portion, may include a second switch portion connected to the switch portion in series, between the second conductive path and the third conductive path. Also, the second switch portion may be configured to switch between an off-state where power supply from the second conductive path side to the third conductive path side is shut off and an on-state where it is permitted. In addition, the control unit may switch the switch portion to the off-state and switch the second switch portion to the on-state when at least one of the first power supply circuit and the second conductive path is in a predetermined normal state, switch the switch portion to the on-state when the first power supply circuit and the second conductive path are in a predetermined abnormal state, and switch the second switch portion to the off-state (when the first power supply circuit and the second conductive path are) in a second abnormal state different from the predetermined normal state and the predetermined abnormal state.

In this power supply apparatus for a vehicle, in the predetermined normal state, the switch portion is switched to the off-state and the second switch portion is switched to the on-state, and thus, in the normal state, power supply from the third conductive path side to the second conductive path side is shut off and power supply from the second conductive path side to the third conductive path side is enabled via the diode provided in parallel with the switch portion and the second switch portion switched to the on-state. Therefore, in the normal state, a voltage decrease on the second conductive path side is unlikely to affect the third conductive path side, and if a voltage decreases on the third conductive path side, power is compensated for from the second conductive path side.

When the predetermined abnormal state is entered, the switch portion is switched to the on-state, and thus power supply from the third conductive path side to the second conductive path side is permitted. Therefore, in the predetermined abnormal state, power can be compensated for from the third conductive path side to the second conductive path side.

When the second abnormal state is entered, the second switch portion is switched to the off-state, and thus, a current flowing in from the second conductive path side to the third conductive path side via the diode provided in parallel with the switch portion is shut off.

The control unit may switch the second switch portion to the off-state in the second abnormal state, that is when a value of a voltage that is applied to the second conductive path is larger than or equal to a predetermined voltage threshold value.

In an excessive voltage state where a voltage that is applied to the second conductive path is larger than or equal to the predetermined voltage threshold value, this power supply apparatus for a vehicle can switch the second switch portion to the off-state, and thereby shut off a current flowing in from the second conductive path side to the third conductive path side, the current having been caused by the excessive voltage. Therefore, when the second conductive path is in the excessive voltage state, it is possible to prevent the excessive voltage from affecting the third conductive path.

First Embodiment

A first embodiment that embodies the present disclosure will be described below.

A power supply system 100 for vehicles (hereinafter, also simply referred to as "power supply system 100") shown in FIG. 1 is configured as a system that includes a first power storage unit 91 configured as a power storage unit for vehicles, a second power storage unit 92 different from the first power storage unit 91, a power supply apparatus 1 for vehicles (hereinafter, also simply referred to as "power supply apparatus 1"), and wires 71, 72, 73A, and 73N. The power supply system 100 can supply power to a first load 81 and second loads 82A and 82N mounted in the vehicle.

The first power storage unit 91 is equivalent to an example of a power storage unit for vehicles, and is constituted by a power storage means such as a lithium ion battery or an electric double layer capacitor, and generates a first predetermined voltage. For example, the potential in a high-potential terminal of the first power storage unit 91 is kept at 48 V and the potential in a low-potential terminal is kept at the ground potential (0 V). The high-potential terminal of the first power storage unit 91 is electrically connected to the wire 71 provided in the vehicle, and the first power storage unit 91 applies a predetermined voltage to the wire 71. The low-potential terminal of the first power storage unit 91 is electrically connected to a ground portion in the vehicle. The wire 71 is connected to an input terminal P1 of the power supply apparatus 1, and is electrically connected to a first conductive path 41 via the input terminal P1.

The second power storage unit 92 is constituted by a power storage means such as a lead storage battery, and generates a second predetermined voltage that is lower than the first predetermined voltage that is generated by the first power storage unit 91. For example, a high-potential terminal of the second power storage unit 92 is kept at 12 V and a low-potential terminal is kept at the ground potential (0 V). The high-potential terminal of the second power storage unit 92 is electrically connected to the wire 72 provided in the vehicle, and the second power storage unit 92 applies a predetermined voltage to the wire 72. The low-potential terminal of the second power storage unit 92 is electrically connected to a ground portion in the vehicle. The wire 72 is connected to an output terminal P2 of the power supply apparatus 1, and is electrically connected to a second conductive path 42 via the output terminal P2.

The first load 81 is a load electrically connected to the wire 72, and is a load to be supplied with power from the power supply apparatus 1 or the second power storage unit 92 via the wire 72. Various known loads for vehicles can be used as the first load 81.

The second loads 82A and 82N are loads electrically connected not to the wire 72 connected to the second power storage unit 92 but to other wires, namely the wires 73A and 73N, and are loads that are supplied with power via these wires 73A and 73N. Various known loads for vehicles can be used as the second loads 82A and 82N. The second loads 82A and 82N are loads of a type different from the type of the first load 81. The wire 73A connected to the second load 82A is electrically connected to a third conductive path 43A, which will be described later, via an output terminal P3, and the second load 82A can be supplied with power from a second power supply circuit 20A via the third conductive path 43A and the wire 73A. The wire 73N connected to the second load 82N is electrically connected to a third conductive path 43N, which will be described later, via an output terminal P4, and the second load 82N can be supplied with power from a second power supply circuit 20N via the third conductive path 43N and the wire 73N.

The power supply apparatus 1 is provided with the first conductive path 41, the second conductive path 42, the third conductive paths 43A and 43N, a reference conductive path 3, a first power supply circuit 10, the second power supply circuits 20A and 20N, and relay units Ra and Rn.

The first conductive path 41 is a path through which power is supplied from the first power storage unit 91 (power storage unit for vehicles), and is configured as a power supply line on the primary side (high-voltage side) on which a relatively high voltage is applied. A configuration is adopted in which the first conductive path 41 is electrically connected to the high-potential terminal of the first power storage unit 91 via the wire 71, and a predetermined DC voltage is applied to the first conductive path 41 from the first power storage unit 91. In the configuration in FIG. 1, the input terminal P1 is provided at the end of the first conductive path 41, and the wire 71 is connected to this input terminal P1.

The second conductive path 42 is configured as a power supply line on the secondary side (low voltage side) on which a relatively low voltage is applied, and is a path electrically connected to one or more first loads 81. A configuration is adopted in which the second conductive path 42 is electrically connected to the high-potential terminal of the second power storage unit 92 via the wire 72, and a DC voltage smaller than an output voltage of the first power storage unit 91 is applied from the second power storage unit 92 to the second conductive path 42. In the configuration in FIG. 1, the output terminal P2 is provided at the end of the second conductive path 42, and the wire 72 is electrically connected to this output terminal P2.

The third conductive paths 43A and 43N are paths that are electrically connected to one or more second loads, namely the second loads 82A and 82N different from the first load 81. The third conductive path 43A is electrically connected to the second load 82A via the wire 73A. The third conductive path 43N is electrically connected to the second load 82N via the wire 73N.

The reference conductive path 3 is configured for example as a wiring pattern, a metal layer, or a metal member provided on a wiring substrate on which the first power supply circuit 10, the second power supply circuits 20A and 20N, and the like are mounted, and is electrically connected to a ground portion in the vehicle.

Figure 2:
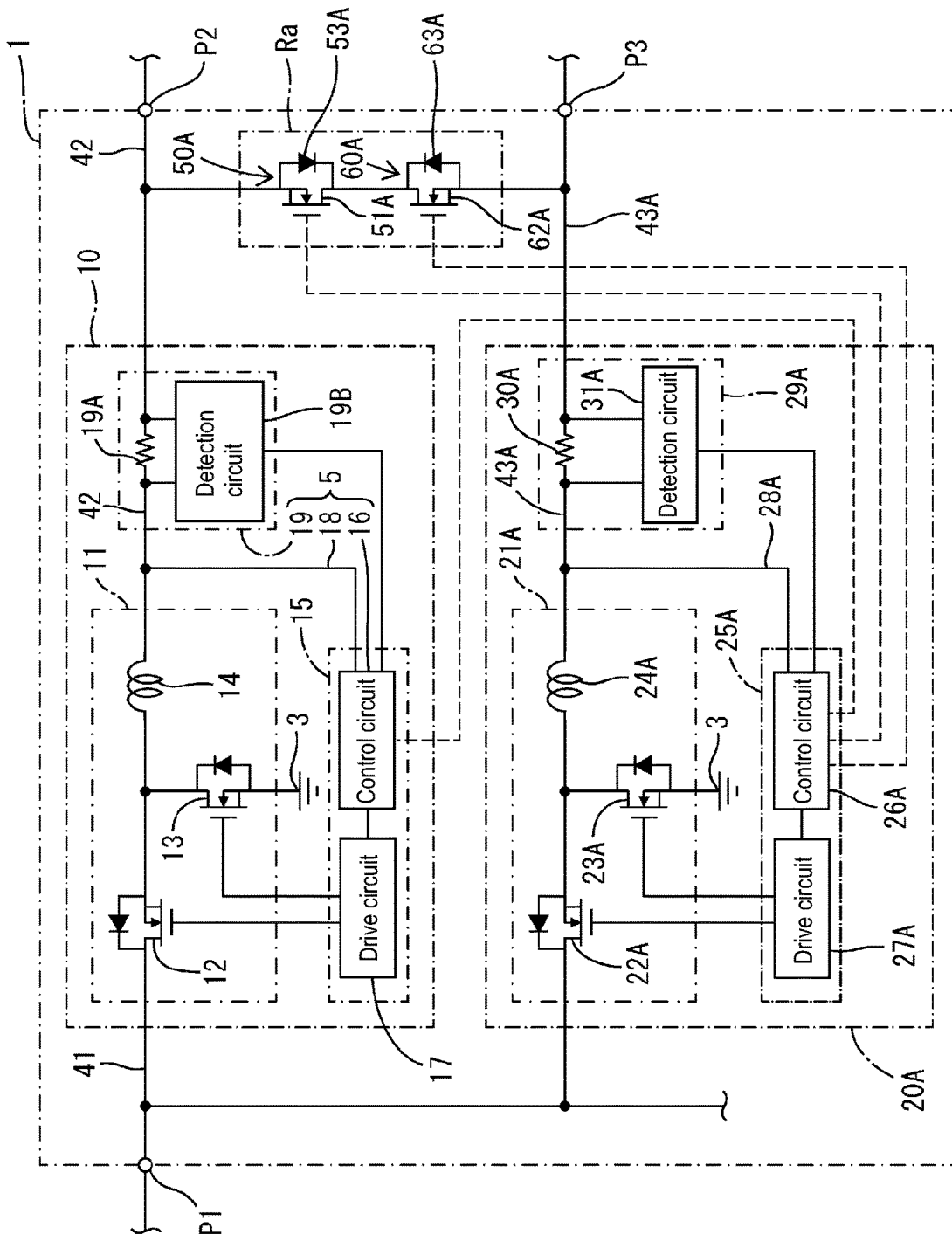
FIG. 2 is a circuit diagram illustrating the power supply apparatus for vehicles of the first embodiment, a portion thereof being omitted.

FIG. 2 is a circuit diagram specifically illustrating the configuration of the power supply apparatus 1, and illustration of some circuits (such as the second power supply circuit 20N) is omitted. As shown in FIG. 2, the first power supply circuit 10 is configured as a step-down DCDC converter for vehicles that is mounted in a vehicle, and is mainly provided with a voltage conversion unit 11, a drive unit 15, a voltage detection unit 18, a current detection unit 19, and the like. The first power supply circuit 10 decreases a DC voltage (input voltage) applied to the first conductive path 41, and apply a desired DC voltage (output voltage) to the second conductive path 42. "Voltage that is applied to the first conductive path 41" refers to a potential difference between the first conductive path 41 and the reference conductive path 3. "Voltage that is applied to the second conductive path 42" refers to a potential difference between the second conductive path 42 and the reference conductive path 3.

The voltage conversion unit 11 includes a high-side first element 12 configured as a semiconductor switching element provided between the first conductive path 41 and the second conductive path 42 electrically connected to the first conductive path 41, a low-side second element 13 configured as a semiconductor switching element electrically connected between the first element 12 and the reference conductive path 3 (a conductive path maintained at a predetermined reference potential that is lower than a potential in the first conductive path 41), and an inductor 14 electrically connected between the second conductive path 42 and the first element 12 and the second element 13. The voltage conversion unit 11 forms a main portion of the switching-type step-down DCDC converter, and can perform a step-down operation for decreasing a voltage applied to the first conductive path 41 by switching between an on operation and an off operation of the first element 12, and outputting the resulting voltage to the second conductive path 42.

Both the first element 12 and the second element 13 are configured as an N-channel MOSFET. One end of the first conductive path 41 is connected to the drain of the high-side first element 12, and is also electrically connected to a high-potential terminal of the first power storage unit 91 via the first conductive path 41 and the wire 71 (FIG. 1). The drain of the low-side second element 13 and one end of the inductor 14 are electrically connected to the source of the first element 12. A configuration is adopted in which a drive signal and a non-drive signal from a drive circuit 17 provided in the drive unit 15 are input to the gate of the first element 12, and the first element 12 is switched on/off in accordance with a signal from the drive unit 15. The source of the low-side second element 13 is electrically connected to the reference conductive path 3, and is kept at the ground potential. A drive signal and a non-drive signal from the drive unit 15 are also input to the gate of the second element 13, and the second element 13 is switched on/off in accordance with a signal from the drive unit 15. One end of the inductor 14 is connected to the connection node between the first element 12 and the second element 13, and this one end is electrically connected to the source of the first element 12 and the drain of the second element 13. The other end of the inductor 14 is electrically connected to the second conductive path 42.

The voltage detection unit 18 is electrically connected to the second conductive path 42, and is configured to input, to a control circuit 16, a value that is based on a voltage at a predetermined position on the second conductive path 42. It suffices for the voltage detection unit 18 to be a known voltage detection circuit that can input, to the control circuit 16, a value indicating a voltage in the second conductive path 42 (a voltage at a connection position of the voltage detection unit 18). The voltage detection unit 18 may be configured to input a voltage value in the second conductive path 42 directly to the control circuit 16 as shown in FIG. 2, or may be configured as a voltage dividing circuit that divides a voltage in the second conductive path 42 and input the result to the control circuit 16.

The current detection unit 19 has a resistor 19A and a detection circuit 19B, and outputs a value indicating the current that flows through the second conductive path 42 (specifically, an analog voltage that is based on the value of the current that flows through the second conductive path 42). For example, the detection circuit 19B is configured as a differential amplifier, and a voltage decrease in the resistor 19A caused by an output current from the voltage conversion unit 11 is amplified by the detection circuit 19B (differential amplifier), serves as a detection voltage (analog voltage) that is based on the output current, and is input to the control circuit 16. This detection voltage (analog voltage) is then converted into a digital value by an A/D converter (not illustrated) provided in the control circuit 16.

The drive unit 15 includes the control circuit 16 and the drive circuit 17. The control circuit 16 is configured as a microcomputer, for example, and is provided with a CPU that performs various computing processes, a ROM that stores information such as programs, a RAM that stores information that is temporarily generated, the A/D converter that converts an analog voltage that has been input into a digital value, and the like.

When causing the voltage conversion unit 11 to perform a step-down operation, the control circuit 16 performs a feedback calculation so as to approximate a voltage in the second conductive path 42 to a set target value while causing the voltage detection unit 18 to detect a voltage in the second conductive path 42 (a potential difference between the second conductive path 42 and the reference conductive path 3), and generates a PWM signal. Specifically, if the voltage in the second conductive path 42 detected by the voltage detection unit 18 is smaller than the target value, the duty ratio is increased through a feedback calculation so as to approximate to the target value, and if the voltage in the second conductive path 42 detected by the voltage detection unit 18 is larger than the target value, the duty ratio is adjusted and decreased through a feedback calculation so as to approximate to the target value.

The drive circuit 17 applies an on signal for alternately switching on the first element 12 and the second element 13 in a control cycle, to the gates of the first element 12 and the second element 13, based on the PWM signal provided from the control circuit 16. The phase of the on signal that is applied to the gate of the first element 12 is substantially inverse to the on signal that is provided to the gate of the second element 13, while a so-called dead time of the on signal is secured.

As shown in FIG. 2, the second power supply circuit 20A is also configured as a step-down DCDC converter for vehicles similarly to the first power supply circuit 10. The second power supply circuit 20A is mainly provided with a voltage conversion unit 21A, a control unit 25A, a voltage detection unit 28A, a current detection unit 29A, and the like, and the basic configuration and basic operations of the second power supply circuit 20A are similar to those of the first power supply circuit 10. The second power supply circuit 20A decreases a DC voltage (input voltage) applied to the first conductive path 41 and apply a desired DC voltage (output voltage) to the third conductive path 43A. A voltage that is applied to the third conductive path 43A refers to a potential difference between the third conductive path 43A and the reference conductive path 3.

The voltage conversion unit 21A includes a high-side first element 22A configured as a semiconductor switching element that is provided between the first conductive path 41 and the third conductive path 43A and is electrically connected to the first conductive path 41, a low-side second element 23A configured as a semiconductor switching element that is electrically connected between the first element 22A and the reference conductive path 3, and an inductor 24A electrically connected between the third conductive path 43A and the first element 22A and the second element 23A. Both the first element 22A and the second element 23A are configured as an N-channel MOSFET.

The voltage detection unit 18 is electrically connected to the third conductive path 43A, and is configured to input, to a control circuit 26A, a value that is based on a voltage at a predetermined position on the third conductive path 43A. The voltage detection unit 28A is configured as a known voltage detection circuit that can input, to the control circuit 26A, a value indicating a voltage on the third conductive path 43A (a voltage at the connection position of the voltage detection unit 28A). The current detection unit 29A includes a resistor 30A and a detection circuit 31A, and outputs a value indicating a current that flows through the third conductive path 43A (specifically, an analog voltage that is based on the value of a current that flows through the third conductive path 43A). The detection circuit 31A is configured as a differential amplifier, for example, and a voltage decrease in the resistor 30A caused by an output current from the voltage conversion unit 21A is amplified by the detection circuit 31A (differential amplifier), becomes a detection voltage (analog voltage) that is based on the output current, and is input to the control circuit 26A.

The control unit 25A is provided with the control circuit 26A and a drive circuit 27A. The control circuit 26A is configured as a microcomputer, for example, and is provided with a CPU, a ROM, a RAM, an A/D converter, and the like. When causing the voltage conversion unit 21A to perform a step-down operation, the control circuit 26A performs a feedback calculation so as to approximate a voltage on the third conductive path 43A to a set target value while causing the voltage detection unit 28A to detect a voltage on the third conductive path 43A (a potential difference between the third conductive path 43A and the reference conductive path 3), and generates a PWM signal. The drive circuit 27A applies an on signal for alternately switching on the first element 22A and the second element 23A in respective control cycles, to the gates of the first element 22A and the second element 23A, based on the PWM signal provided from the control circuit 26A.

As shown in FIG. 1, in the power supply apparatus 1, a circuit that has a configuration similar to that of the above-described second power supply circuit 20A is provided in parallel with the second power supply circuit 20A. This second power supply circuit 20N is also configured as a step-down DCDC converter for vehicles similarly to those of the first power supply circuit 10 and the second power supply circuit 20A.

Figure 3:
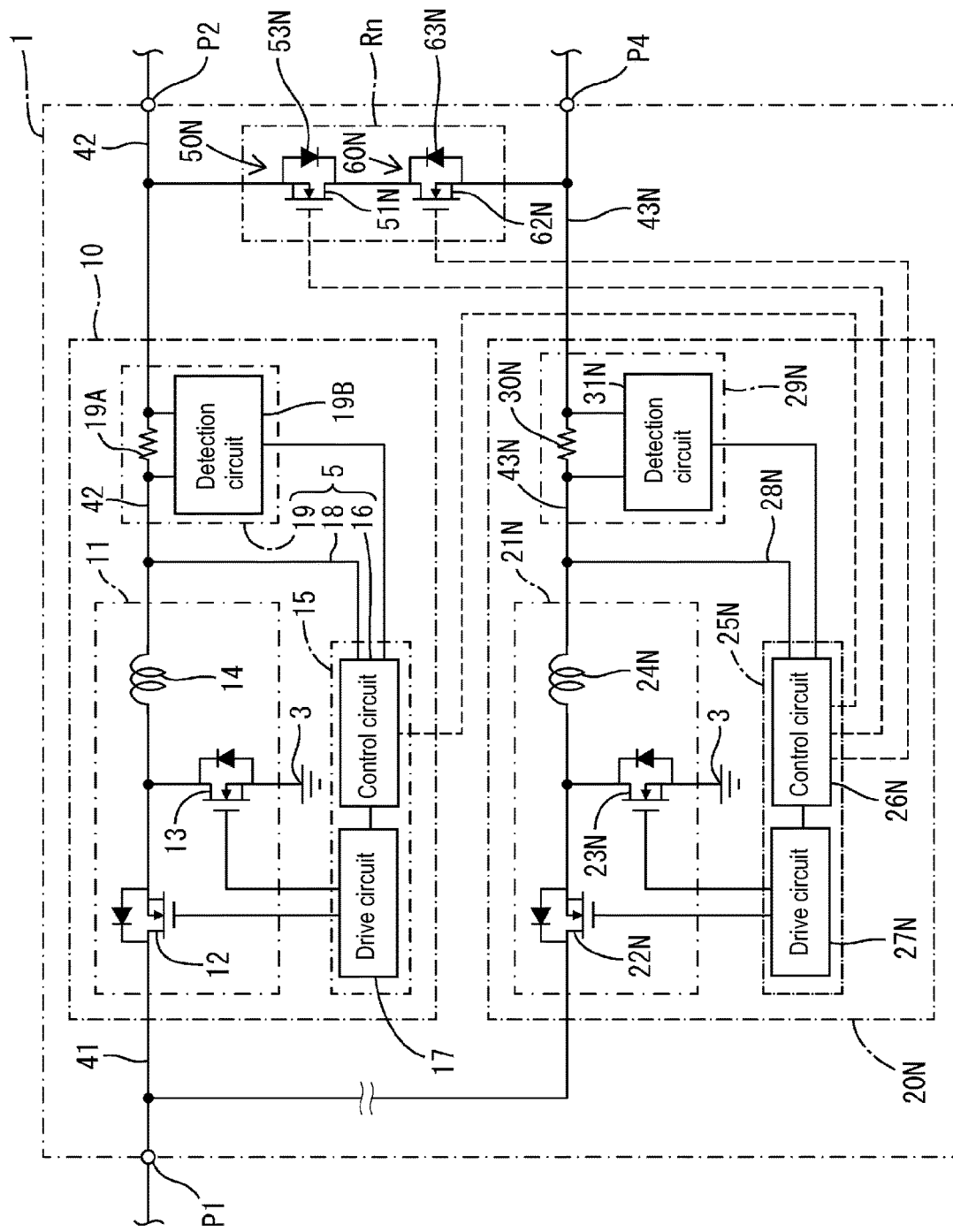
FIG. 3 is a circuit diagram illustrating the power supply apparatus for vehicles of the first embodiment, a different portion thereof than in FIG. 2 being omitted.

FIG. 3 is a circuit diagram specifically illustrating the configuration of the power supply apparatus 1, and illustration of some circuits (such as the second power supply circuit 20A) is omitted. The second power supply circuit 20N is mainly provided with a voltage conversion unit 21N, a control unit 25N, a voltage detection unit 28N, a current detection unit 29N, and the like, and the basic configuration and basic operations of the second power supply circuit 20N are similar to those of the first power supply circuit 10 and the second power supply circuit 20A. The second power supply circuit 20N decreases a DC voltage (input voltage) applied to the first conductive path 41 and apply a desired DC voltage (output voltage) to the third conductive path 43N. A voltage that is applied to the third conductive path 43N refers to a potential difference between the third conductive path 43N and the reference conductive path 3.

The voltage conversion unit 21N includes a high-side first element 22N configured as a semiconductor switching element that is provided between the first conductive path 41 and the third conductive path 43N, and is electrically connected to the first conductive path 41, a low-side second element 23N configured as a semiconductor switching element electrically connected between the first element 22N and the reference conductive path 3, and an inductor 24N electrically connected between the third conductive path 43N and the first element 22N and the second element 23N. Both the first element 22N and the second element 23N are configured as an N-channel MOSFET.

The voltage detection unit 18 is electrically connected to the third conductive path 43N, and is configured to input, to a control circuit 26N, a value that is based on a voltage at a predetermined position on the third conductive path 43N. The voltage detection unit 28N is configured as a known voltage detection circuit that can input, to the control circuit 26N, a value indicating a voltage on the third conductive path 43N (a voltage at the connection position of the voltage detection unit 28N). The current detection unit 29N includes a resistor 30N and a detection circuit 31N, and outputs a value indicating a current that flows through the third conductive path 43N (specifically, an analog voltage that is based on the value of a current that flows through the third conductive path 43N). The detection circuit 31N is configured as a differential amplifier, for example, and a voltage decrease in the resistor 30N caused by an output current from the voltage conversion unit 21N is amplified by the detection circuit 31N (differential amplifier), becomes a detection voltage (analog voltage) that is based on the output current, and is input to the control circuit 26N.

The control unit 25N is provided with the control circuit 26N and a drive circuit 27N. The control circuit 26N is configured as a microcomputer, for example, and is provided with a CPU, a ROM, a RAM, an A/D converter, and the like. When causing the voltage conversion unit 21N to perform a step-down operation, the control circuit 26N performs a feedback calculation so as to approximate a voltage on the third conductive path 43N to a set target value while causing the voltage detection unit 28N to detect a voltage on the third conductive path 43N (a potential difference between the third conductive path 43N and the reference conductive path 3), and generates a PWM signal. The drive circuit 27N applies an on signal for alternately switching on the first element 22N and the second element 23N in respective control cycles, to the gates of the first element 22N and the second element 23N, based on the PWM signal provided from the control circuit 26N.

In this manner, in the power supply apparatus 1, a plurality of second power supply circuits, namely the second power supply circuits 20A and 20N are provided in parallel, and both function as a synchronous rectification step-down DCDC converter, converting a voltage applied to the first conductive path 41 and applying a desired voltage to the corresponding third conductive paths. By switching between an on operation and an off operation of the low-side second element 23A in synchronization with an operation of the high-side first element 22A, the second power supply circuit 20A decreases a DC voltage (input voltage) applied to the first conductive path 41, and applies a desired DC voltage (output voltage) to the third conductive path 43A. Similarly, by switching between an on operation and an off operation of the low-side second element 23N in synchronization with an operation of the high-side first element 22N, the second power supply circuit 20N decreases a DC voltage (input voltage) applied to the first conductive path 41, and applies a desired DC voltage (output voltage) to the third conductive path 43N.

As shown in FIG. 1, in the power supply apparatus 1, the first power supply circuit 10 is connected to the second conductive path 42, and a plurality of second power supply circuits, namely the second power supply circuits 20A and 20N are respectively connected to a plurality of third conductive paths, namely the third conductive paths 43A and 43N. Also, the relay units Ra and Rn are provided respectively on the path between the third conductive path 43A and the second conductive path 42 and the path between the third conductive path 43N and the second conductive path 42, and switch portions 51A and 51N are respectively interposed on the paths.

The relay unit Ra includes a MOSFET 50A, a portion of which functions as the switch portion 51A and a MOSFET 60A, a portion of which functions as a second switch portion 62A, and these MOSFETs 50A and 60A are connected in series between the second conductive path 42 and the third conductive path 43A.

The MOSFET 50A is configured as an N-channel MOSFET, whose source is electrically connected to the second conductive path 42 and whose drain is electrically connected to the drain of the MOSFET 60A. A diode 53A is a body diode of the MOSFET 50A, and the anode thereof is electrically connected to the second conductive path 42 and the cathode is electrically connected to the drain of the MOSFET 60A and the cathode of a diode 63A. A portion of the MOSFET 50A excluding the diode 53A represents the switch portion 51A. The switch portion 51A is provided between the third conductive path 43A and the second conductive path 42, and is switched between an off-state where power supply from the third conductive path 43A side to the second conductive path 42 side is shut off and an on-state where it is permitted.

The MOSFET 60A is configured as an N-channel MOSFET, whose source is electrically connected to the third conductive path 43A and whose drain is electrically connected to the drain of the MOSFET 50A. The diode 63A is a body diode of the MOSFET 60A, and the anode thereof is electrically connected to the third conductive path 43A and the cathode thereof is electrically connected to the drain of the MOSFET 50A and the cathode of the diode 53A. A portion of the MOSFET 60A excluding the diode 63A represents the second switch portion 62A. The second switch portion 62A is connected to the switch portion 51A in series, between the second conductive path 42 and the third conductive path 43A, and is switched between an off-state where power supply from the second conductive path 42 side to the third conductive path 43A side is shut off and an on-state where it is permitted.

The relay unit Rn has a configuration similar to that of the relay unit Ra, and functions similarly to the relay unit Ra. The relay unit Rn includes a MOSFET 50N, a portion of which functions as the switch portion 51N and a MOSFET 60N, a portion of which functions as a second switch portion 62N, and these MOSFETs 50N and 60N are connected in series, between the second conductive path 42 and the third conductive path 43N. A portion of the MOSFET 50N excluding a diode 53N (body diode) represents the switch portion 51N. A portion of the MOSFET 60N excluding a diode 63N represents the second switch portion 62N.

Next, the control that is performed in the power supply apparatus 1 will be described in detail.

In the power supply system 100 shown in FIG. 1, when a start switch (e.g., an ignition switch, not illustrated) for starting the vehicle is on, an on signal (e.g., an ignition-on signal) is supplied from an external apparatus to the power supply apparatus 1, and when the start switch is off, an off signal (e.g., an ignition-off signal) is supplied from the external apparatus to the power supply apparatus 1. Note that, in the example in FIG. 4, the timing when a signal that is input to the power supply apparatus 1 is switched from an off signal (a signal indicating that the start switch is off) to an on signal (a signal indicating that the start switch is on) is a time t1.

In the example shown in FIG. 4, under a start condition that a signal supplied from the outside to the power supply apparatus 1 has switched from an off signal to an on signal, the drive unit 15 of the first power supply circuit 10 starts driving the voltage conversion unit 11 to perform a voltage conversion operation. The first power supply circuit 10 functions as a synchronous rectification step-down DCDC converter, and, decreases a DC voltage (input voltage) applied to the first conductive path 41 by switching between an on operation and an off operation of the low-side second element 13 in synchronization of an operation of the high-side first element 12 under control of the drive unit 15, and applies a desired DC voltage (output voltage) to the second conductive path 42. The magnitude of the DC voltage (output voltage) that is applied to the second conductive path 42 is determined in accordance with the duty ratio of a PWM signal supplied to the gate of the first element 12. In the example in FIG. 1, instructed values of a target voltage and a target current are input from an external ECU 102 (control ECU) provided outside of the power supply apparatus 1 to the drive unit 15. In a predetermined normal state, the drive unit 15 causes the voltage conversion unit 11 to perform a step-down operation, while repeating a feedback calculation and adjusting the duty ratio of the PWM signal so as to approximate the voltage value and current value on the second conductive path 42 to the target voltage value and target current value instructed from the external ECU 102 based on the voltage value and current value on the second conductive path 42 monitored by the voltage detection unit 18, the current detection unit 19, and the control circuit 16. Note that various types of known control can be adopted as control for approximating the output voltage value and output current value of the voltage conversion unit 11 to the target voltage value and target current value based on the voltage value and current value detected on the output-side conductive path (the second conductive path 42).

In addition, when a predetermined condition is met, the drive unit 15 limits one of or both the target voltage value and target current value to be smaller than the value(s) instructed by the external ECU 102. For example, a predetermined condition may be met when the voltage value on the first conductive path 41 or the second conductive path 42 is larger than or equal to predetermined voltage value, a predetermined condition may also be met when the current value on the first conductive path 41 or the second conductive path 42 is larger than or equal to a predetermined current value, or a predetermined condition may also be met when the temperature at a predetermined position in the power supply apparatus 1 is larger than or equal to a predetermined temperature. When such a predetermined condition is met, one of or both the target voltage value and the target current value are limited to be smaller than the value(s) instructed by the external ECU 102.

In this manner, in a normal case, the drive unit 15 sets a target voltage value and a target current value to values instructed by the external ECU 102 (control ECU), and, when the predetermined condition is met, limits one of or both the target voltage value and the target current value to be smaller than the value(s) instructed by the external ECU 102. In any case, a target voltage value and a target current value are set, and the drive unit 15 performs control so as to approximate the voltage value and the current value on the second conductive path 42 to the target voltage value and the target current value based on the voltage value (actual voltage value) and the current value (actual current value) on the second conductive path 42 detected by the voltage detection unit 18, the current detection unit 19, and the control circuit 16.

Similarly, under a start condition that a signal supplied from the outside to the power supply apparatus 1 has switched from an off signal to an on signal, the control units 25A and 25N of the respective second power supply circuits 20A and 20N also start driving the voltage conversion units 21A and 21N to perform a voltage conversion operation. The second power supply circuits 20A and 20N each function as a synchronous rectification step-down DCDC converter. The second power supply circuit 20A shown in FIG. 2 decreases a DC voltage (input voltage) applied to the first conductive path 41 under control of the control unit 25A, and applies a desired DC voltage (output voltage) to the third conductive path 43A. The magnitude of the DC voltage (output voltage) that is applied to the third conductive path 43A is determined in accordance with the duty ratio of a PWM signal supplied to the gate of the first element 22A. The second power supply circuit 20N shown in FIG. 3 decreases a DC voltage (input voltage) applied to the first conductive path 41 under control of the control unit 25N, and applies a desired DC voltage (output voltage) to the third conductive path 43N. The magnitude of the DC voltage (output voltage) that is applied to the third conductive path 43N is determined in accordance with the duty ratio of a PWM signal that is supplied to the gate of the first element 22N.

A configuration is adopted in which, if the difference between the voltage value (actual voltage value) on the second conductive path 42 detected by the voltage detection unit 18 and the set target voltage value is smaller than a predetermined first value, and the difference between the current value (actual current value) on the second conductive path 42 detected by the current detection unit 19 and the set target current value is smaller than a predetermined second value, the control circuit 16 of the drive unit 15 shown in FIG. 2 determines that this case is a normal state, and outputs a predetermined normal signal to the control circuit 26A of the second power supply circuit 20A and the control circuit 26N of the second power supply circuit 20N. On the other hand, a configuration is adopted in which, if the voltage value (actual voltage value) on the second conductive path 42 detected by the voltage detection unit 18 is smaller than the set target voltage value, and the difference between them is larger than or equal to the above first value, or if the current value (actual current value) on the second conductive path 42 detected by the current detection unit 19 is smaller than the set target current value, and the difference between them is larger than or equal to the above second value, the control circuit 16 outputs a first abnormal signal to the control circuit 26A of the second power supply circuit 20A and the control circuit 26N of the second power supply circuit 20N. In the example in FIG. 4, for some reason, output of the first power supply circuit 10 stopped at a time t2, and the first abnormal signal is output at a time t3. A configuration is also adopted in which, if the voltage value (actual voltage value) on the second conductive path 42 detected by the voltage detection unit 18 is larger than or equal to a predetermined voltage threshold value (second abnormal state), the control circuit 16 outputs a second abnormal signal to the control circuit 26A of the second power supply circuit 20A and the control circuit 26N of the second power supply circuit 20N.

If the normal signal is output from the control circuit 16 after driving of the voltage conversion unit 21A has been started (in other words, when the first power supply circuit 10 and the second conductive path 42 are in the predetermined normal state), the control unit 25A of the second power supply circuit 20A switches the switch portion 51A (first switch portion) off, and switches the second switch portion 62A on. In the example in FIG. 4, during a period from the time t1 to the time t3, the switch portion 51A (first switch portion) is switched off, and the second switch portion 62A is switched on, and thus flow of a current from the third conductive path 43A side to the second conductive path 42 side is shut off. In addition, when the potential on the third conductive path 43A is lower than the potential on the second conductive path 42 to a certain degree, a current flows via the diode 53A and the second switch portion 62A, and a decrease in the potential in the third conductive path 43A is suppressed. In addition, the control unit 25N of the second power supply circuit 20N operates similarly, and when the normal signal is output from the control circuit 16 after driving of the voltage conversion unit 21N has been started, switches the switch portion 51N (first switch portion) off and switches the second switch portion 62N on, and shuts off flow of a current from the third conductive path 43N side to the second conductive path 42 side, and, meanwhile, when the potential on the third conductive path 43N is lower than the potential on the second conductive path 42 to a certain degree, a current flows through the diode 53N and the second switch portion 62N.

If the first abnormal signal is output from the control circuit 16 after driving of the voltage conversion unit 21A has been started (i.e., if the voltage value on the second conductive path 42 detected by a detection unit 5 is lower than the target voltage value by at least the first value, or the current value on the second conductive path 42 detected by the detection unit 5 is lower than the target current value by at least the second value), the control unit 25A of the second power supply circuit 20A switches the switch portion 51A (first switch portion) on, and maintains the second switch portion 62A to be on as well. Similarly, if the first abnormal signal is output from the control circuit 16 after driving of the voltage conversion unit 21N has been started, the control unit 25N of the second power supply circuit 20N switches the switch portion 51N (first switch portion) on and maintains the second switch portion 62N to be on as well. In this manner, if (the level of) output to the second conductive path 42 decreases, the switch portions 51A and 51N are switched on, and thus a portion of power that is supplied from the second power supply circuits 20A and 20N replenishes the power on the second conductive path 42. Note that, in the example shown in FIG. 4, during a period from the time t3 to a time t4, the first abnormal signal is output from the control circuit 16. In addition, after the time t4, the first abnormal signal is cancelled, and, during a period from the time t4 to a time t5, the normal signal is output.

If the second abnormal signal is output from the control circuit 16 after driving of the voltage conversion unit 21A has been started (i.e., if the voltage value on the second conductive path 42 detected by the detection unit 5 is larger than or equal to the predetermined voltage threshold value (second abnormal state)), the control unit 25A of the second power supply circuit 20A switches the switch portion 51A (first switch portion) off and switches the second switch portion 62A off as well. Similarly, if the second abnormal signal is output from the control circuit 16 after driving of the voltage conversion unit 21N has been started, the control unit 25N of the second power supply circuit 20N switches the switch portion 51N (first switch portion) off and switches the second switch portion 62N off as well. If the second conductive path 42 enters an excessive voltage state, the second switch portions 62A and 62N are switched off in this manner, and thus the excessive voltage on the second conductive path 42 no longer affects the third conductive paths 43A and 43N, and it is possible to prevent an excessive voltage in the third conductive paths 43A and 43N. Note that, in the example shown in FIG. 4, during a period from the time t5 to a time t6, the second abnormal signal is output from the control circuit 16.

An effect of this configuration will be described below.

The above-described power supply apparatus for vehicles 1 includes the first power supply circuit 10 that converts a voltage applied to the first conductive path 41, which is a path through which power is supplied from the first power storage unit 91 (power storage unit for vehicles), and applies the resulting voltage to the second conductive path 42, and the second power supply circuits 20A and 20N that convert a voltage applied to the first conductive path 41, and apply the resulting voltage to the third conductive paths 43A and 43N. Since such a configuration is adopted, power can be supplied to the first load 81 via the second conductive path 42, and power can be supplied to the second loads 82A and 82N via the third conductive paths 43A and 43N.

If at least one of the first power supply circuit 10 and the second conductive path 42 is in a predetermined abnormal state, the control units 25A and 25N switch the switch portions 51A and 51N on, and otherwise switch the switch portions 51A and 51N off. In this manner, if the first power supply circuit 10 and the second conductive path 42 are not in the predetermined abnormal state, the switch portions 51A and 51N are switched off, and power supply from the third conductive path 43A side and the third conductive path 43N side to the second conductive path 42 side is shut off, and thus, if a temporary voltage decrease or the like occurs on the second conductive path 42, a current that flows in from the third conductive path 43A side and the third conductive path 43N side to the second conductive path 42 side can be prevented. Therefore, if the first power supply circuit 10 and the second conductive path 42 are not in the predetermined abnormal state, the state on the second conductive path 42 side is unlikely to affect the third conductive paths 43A and 43N, and it is easy to stably maintain the states of the third conductive paths 43A and 43N. On the other hand, in the predetermined abnormal state, the switch portions 51A and 51N are switched to an on-state, and power supply from the third conductive path 43A side and the third conductive path 43N side to the second conductive path 42 side is permitted. During a period of such an operation, even if a voltage or current decreases on the second conductive path 42 side, power is compensated for from the third conductive path 43A side and the third conductive path 43N side, and the decrease in the voltage or current can be suppressed.

The second conductive path 42 is electrically connected to the second power storage unit 92 different from the first power storage unit 91 (power storage unit for vehicle). With this configuration, power can be supplied from the second power storage unit 92 to the first load 81, and the second power storage unit 92 can be charged with power supplied from the first power supply circuit 10. With this configuration, if the charging voltage for the second power storage unit 92 decreases, the first load 81 is likely to be affected by the decrease, but the second loads 82A and 82N electrically connected to the respective third conductive paths 43A and 43N are unlikely to be affected by the decrease in the charging voltage.

The power supply apparatus for vehicles 1 has the detection unit 5 that detects the value of a voltage that is applied to the second conductive path 42 or the value of a current that flows through the second conductive path 42. Specifically, the voltage detection unit 18, the current detection unit 19, and the control circuit 16 constitute the detection unit 5. In addition, the first power supply circuit 10 includes the voltage conversion unit 11 that converts a voltage applied to the first conductive path 41 and generates a voltage that is applied to the second conductive path 42, and the drive unit 15 that drives the voltage conversion unit 11 such that the value of a voltage that is applied to the second conductive path 42 or the value of a current that flows through the second conductive path 42 reaches the target value. The control units 25A and 25N switch the switch portions 51A and 51N on in a predetermined abnormal state, that is when the value of a voltage or a current detected by the detection unit 5 is lower than the target value by at least a certain value. This power supply apparatus for vehicles 1 operates so as to switch the switch portions 51A and 51N on and compensate for power from the third conductive path 43A side and the third conductive path 43N side to the second conductive path 42 side, when the voltage value or current value on the second conductive path 42 decreases to a certain degree. Therefore, even in a situation where a voltage value or a current value on the second conductive path 42 decreases to a certain degree, a voltage decrease or current decrease on the second conductive path 42 is easily suppressed.

The power supply apparatus for vehicles 1 includes a plurality of second power supply circuits, namely the second power supply circuits 20A and 20N, a plurality of third conductive paths, namely the third conductive paths 43A and 43N, and a plurality of switch portions, namely the switch portions 51A and 51N. Also, the second power supply circuits 20A and 20N are respectively connected to the third conductive paths 43A and 43N, and the switch portions 51A and 51N are respectively provided between the second conductive path 42 and the third conductive paths 43A and 43N. Both the switch portions 51A and 51N switch between an off-state where power supply from a corresponding third conductive path side to the second conductive path 42 side is shut off and an on-state where it is permitted. This power supply apparatus for vehicles 1 can supply power to the second loads 82A and 82N respectively using the second power supply circuits 20A and 20N, and it is easy to stably supply power to the second loads 82A and 82N without being affected by a decrease in a voltage or current on the second conductive path 42 side. On the other hand, in the predetermined abnormal state, the switch portions 51A and 51N are switched on, and a state is entered where power can be supplied from the third conductive path 43A side and the third conductive path 43N side to the second conductive path 42 side. In this manner, when the predetermined abnormal state is entered on the second conductive path 42 side, a plurality of paths for compensating for power are secured, and thus it is easy to supply power more reliably and more sufficiently from the third conductive path 43A side and the third conductive path 43N side to the second conductive path 42 side.

The power supply apparatus for vehicles 1 has diodes 53A and 53N that are provided in parallel with switch portions, and the anodes of the diodes 53A and 53N are connected on the second conductive path 42 side, and the cathodes are connected on the third conductive path side. Also, a configuration is adopted in which, when the control units 25A and 25N maintain the switch portions 51A and 51N to be off, the anodes of the diodes 53A and 53N are electrically connected to the second conductive path 42, and the cathodes are electrically connected to the third conductive paths 43A and 43N. In this power supply apparatus for vehicles 1, when the control units 25A and 25N maintain the switch portions 51A and 51N to be off, a current that is about to flow in from the third conductive path 43A side and the third conductive path 43N side to the second conductive path 42 side is shut off, but a current that is about to flow in from the second conductive path 42 side to the third conductive path 43A side and the third conductive path 43N side is permitted by the diodes 53A and 53N respectively. Accordingly, even if a voltage that is applied to the third conductive paths 43A and 43N decreases significantly below a voltage that is applied to the second conductive path 42, the decrease in the voltage on the third conductive paths 43A and 43N is suppressed as a result of a current flowing in from the second conductive path 42 to the third conductive paths 43A and 43N via the diodes 53A and 53N. Therefore, the third conductive paths 43A and 43N, which are paths for supplying power to the second loads 82A and 82N, are more easily stabilized.

In the power supply apparatus for vehicles 1, the second switch portions 62A and 62N are provided respectively in series with the switch portions 51A and 51N, between the second conductive path 42 and the third conductive paths 43A and 43N. Moreover, the second switch portions 62A and 62N are configured to switch between an off-state where power supply from the second conductive path 42 side to the third conductive path 43A side and the third conductive path 43N side is shut off and an on-state where it is permitted. The control units 25A and 25N switch the switch portions 51A and 51N to the off-state and the second switch portions 62A and 62N to the on-state when the first power supply circuit 10 and the second conductive path 42 are in a predetermined normal state, to switch the switch portions 51A and 51N to the on-state when the first power supply circuit 10 and the second conductive path 42 are in a predetermined abnormal state, and to switch the second switch portions 62A and 62N to the off-state when the first power supply circuit 10 and the second conductive path 42 are in a second abnormal state different from the predetermined normal state and the predetermined abnormal state. In this power supply apparatus for vehicles 1, in the predetermined normal state, the switch portions 51A and 51N are in the off-state and the second switch portions 62A and 62N are in the on-state, and thus, in the normal state, power supply from the third conductive path 43A side and the third conductive path 43N side to the second conductive path 42 side is shut off, and power supply from the second conductive path 42 side to the third conductive path 43A side and the third conductive path 43N side is enabled by the diodes 53A and 53N provided in parallel with the switch portions 51A and 51N as well as the second switch portions 62A and 62N switched to the on-state. Therefore, in the normal state, a voltage decrease on the second conductive path 42 side is unlikely to affect the third conductive path 43A side and the third conductive path 43N side, and when a voltage decreases on the third conductive path 43A side and the third conductive path 43N side, power is compensated for from the second conductive path 42 side. On the other hand, when the predetermined abnormal state is entered, the switch portions 51A and 51N switch to the on-state, and thus power supply from the third conductive path 43A side and the third conductive path 43N side to the second conductive path 42 side is permitted. Therefore, in the predetermined abnormal state, power can be compensated for from the third conductive path 43A side and the third conductive path 43N side to the second conductive path 42 side. In addition, when the second abnormal state is entered, the second switch portions 62A and 62N are switched to the off-state, and thus it is possible to shut off a current flowing in from the second conductive path 42 side to the third conductive path 43A side and the third conductive path 43N side via the diodes 53A and 53N provided in parallel with the switch portions 51A and 51N, respectively.

The control units 25A and 25N switch the second switch portions 62A and 62N to the off-state in the second abnormal state, that is when the value of a voltage that is applied to the second conductive path 42 is larger than or equal to a predetermined voltage threshold value. In an excessive voltage state where a voltage that is applied to the second conductive path 42 is larger than or equal to the predetermined voltage threshold value, this power supply apparatus for vehicles 1 can switch the second switch portions 62A and 62N to the off-state, and shut off a current flowing in from the second conductive path 42 side to the third conductive path 43A side and the third conductive path 43N side, the current having been caused by the excessive voltage. Therefore, when the second conductive path 42 is in the excessive voltage state, it is possible to prevent the excessive voltage from affecting the third conductive paths 43A and 43N.

OTHER EMBODIMENTS

The present disclosure is not limited to the embodiment described above and described with reference to the drawing, and, for examples, embodiments such as the following are also included in the technical scope of the present disclosure. In addition, the features of the above-described embodiment and features of the embodiments to be described later can be combined in various manners to the extent that there is no contradiction.

In the first embodiment, a configuration has been described in which two second power supply circuits, namely the second power supply circuits 20A and 20N are provided, but the number of second power supply circuits may also be one, or three or larger.

In the first embodiment, the first power supply circuit 10 and the second power supply circuits 20A and 20N are step-down DCDC converters, but they may also be step-up DCDC converters. Alternatively, the power supply circuits may be able to operate as a step-up/down DCDC converter.

In the first embodiment, a configuration has been described in which an abnormal signal is output from the control circuit 16 of the first power supply circuit 10, but the control units 25A and 25N (specifically, the control circuits 26A and 26N) of the second power supply circuits 20A and 20N may also be configured to be capable of acquiring information (specifically, information regarding a target voltage value and target current value that have been set, and information regarding a voltage value and current value detected by the detection unit 5) from the control circuit 16. In this case, a configuration may also be adopted in which both the control units 25A and 25N perform the above-described operation (operation when a normal signal is output) in a normal state, that is when the difference between the voltage value (actual voltage value) on the second conductive path 42 and the target voltage value is smaller than a predetermined first value, and the difference between the current value (actual current value) on the second conductive path 42 and the target current value is smaller than a predetermined second value. In addition, a configuration may also be adopted in which both the control units 25A and 25N perform the above-described operation (operation when a first abnormal signal is output) in a predetermined abnormal state, that is when a voltage value (actual voltage value) on the second conductive path 42 is lower than a target voltage value and the difference between them is larger than or equal to the above first value, or a current value (actual current value) on the second conductive path 42 is smaller than a target current value and the difference between them is larger than or equal to the above second value. In addition, a configuration may also be adopted in which both the control units 25A and 25N perform the above-described operation (operation when a second abnormal signal is output) in a second abnormal state, that is when a voltage value (actual voltage value) on the second conductive path 42 is larger than or equal to a predetermined voltage threshold value.

In the first embodiment, the first power supply circuit 10 and the second power supply circuits 20A and 20N are all single-phase DCDC converters, but one of or all of them may also be a multi-phase DCDC converter.

In the first embodiment, a configuration has been described in which the second power storage unit 92 is electrically connected to the second conductive path 42 that is on the output side, but the second power storage unit 92 does not need to be electrically connected to the second conductive path 42.

In the first embodiment, the first power supply circuit 10 and the second power supply circuits 20A and 20N are all synchronous rectification step-down DCDC converters in which a second element is configured as a switching element, but may also be diode-type step-down DCDC converters in which a second element is configured as a diode (a diode whose cathode is connected to the first element side and whose anode is connected on the reference conductive path side).

The invention claimed is:

1. A power supply apparatus for a vehicle comprising:
a first conductive path that is a path through which power is supplied from a power storage unit for the vehicle;
a second conductive path that is a path electrically connected to one or more first loads;
one or more third conductive paths that are paths electrically connected to one or more second loads that are different from the one or more first loads;
a first power supply circuit that converts a voltage applied to the first conductive path, and applies the resulting voltage to the second conductive path;
one or more second power supply circuits that convert the voltage applied to the first conductive path and apply the resulting voltage to the one or more third conductive paths;
a first relay unit that is provided between the second conductive path and the one or more third conductive paths, the first relay unit having at least one switch and a diode, the diode having an anode and a cathode, the first relay unit switches between an off-state where power supply from the third conductive path side to the second conductive path side is shut off and an on-state where it is permitted; and
a control unit that switches the first relay unit to the off-state when at least one of the first power supply circuit and the second conductive path is not in a predetermined abnormal state, and switches the first relay unit to the on-state when the first power supply circuit and the second conductive path are in the predetermined abnormal state, and
the second conductive path is electrically connected to a second power storage unit different from the power storage unit for the vehicle,
the diode is provided in parallel with one of the at least one switch, the anode of the diode is connected to the second conductive path side and the cathode of the diode is connected to the third conductive path side, and
when the control unit maintains the first relay unit in the off-state, the anode of the diode and the second conductive path are electrically connected to each other, and the cathode and the third conductive path are electrically connected to each other.

2. The power supply apparatus according to claim 1, further comprising a detection unit that detects a value of a voltage that is applied to the second conductive path or a value of a current that flows through the second conductive path,
the first power supply circuit includes:
a voltage conversion unit that converts the voltage applied to the first conductive path, and generates a voltage to be applied to the second conductive path, and
a drive unit that drives the voltage conversion unit such that the value of the voltage that is applied to the second conductive path or the value of the current that flows through the second conductive path reaches a target value, and
the control unit switches the first relay unit to the on-state, taking, as the predetermined abnormal state, a state in which a value of a voltage or current detected by the detection unit is smaller than the target value by at least a certain value.

3. The power supply apparatus according to claim 1, wherein a plurality of second power supply circuits, a plurality of third conductive paths, and a plurality of first relay units are provided,
the plurality of second power supply circuits are respectively connected to the plurality of third conductive paths,
the plurality of first relay units are provided respectively between the second conductive path and the plurality of third conductive paths, and all of the first relay units switch between the off-state where power supply from the corresponding third conductive path side to the second conductive path side is shut off and the on-state where it is permitted.

4. The power supply apparatus according to claim 1, further comprising:
a second relay unit connected to the first relay unit in series, between the second conductive path and the third conductive path, wherein the second relay unit is configured to switch between an off-state where power supply from the second conductive path side to the third conductive path side is shut off and an on-state where it is permitted, and the control unit switches the first relay unit to the off-state and switches the second relay unit to the on-state when at least one of the first power supply circuit and the second conductive path is in a predetermined normal state, switches the first relay unit to the on-state when the first power supply circuit and the second conductive path are in a predetermined abnormal state, and switches the second relay unit to the off-state (when the first power supply circuit and the second conductive path are) in a second abnormal state different from the predetermined normal state and the predetermined abnormal state.

5. The power supply apparatus according to claim 4, wherein the control unit switches the second relay unit to the off-state in the second abnormal state, that is when a value of a voltage that is applied to the second conductive path is larger than or equal to a predetermined voltage threshold value.

6. The power supply apparatus according to claim 2, wherein a plurality of second power supply circuits, a plurality of third conductive paths, and a plurality of first relay units are provided, the plurality of second power supply circuits are respectively connected to the plurality of third conductive paths, the plurality of first relay units are provided respectively between the second conductive path and the plurality of third conductive paths, and all of the first relay units switch between the off-state where power supply from the corresponding third conductive path side to the second conductive path side is shut off and the on-state where it is permitted.

7. The power supply apparatus according to claim 2, further comprising:

a second relay unit connected to the first relay unit in series, between the second conductive path and the third conductive path, wherein the second relay unit is configured to switch between an off-state where power supply from the second conductive path side to the third conductive path side is shut off and an on-state where it is permitted, and the control unit switches the first relay unit to the off-state and switches the second relay unit to the on-state when at least one of the first power supply circuit and the second conductive path is in a predetermined normal state, switches the first relay unit to the on-state when the first power supply circuit and the second conductive path are in a predetermined abnormal state, and switches the second relay unit to the off-state (when the first power supply circuit and the second conductive path are) in a second abnormal state different from the predetermined normal state and the predetermined abnormal state.

8. The power supply apparatus for according to claim 3, further comprising:

a second relay unit connected to the first relay unit in series, between the second conductive path and the third conductive path, wherein the second relay unit is configured to switch between an off-state where power supply from the second conductive path side to the third conductive path side is shut off and an on-state where it is permitted, and the control unit switches the first relay unit to the off-state and switches the second relay unit to the on-state when at least one of the first power supply circuit and the second conductive path is in a predetermined normal state, switches the first relay unit to the on-state when the first power supply circuit and the second conductive path are in a predetermined abnormal state, and switches the second relay unit to the off-state (when the first power supply circuit and the second conductive path are) in a second abnormal state different from the predetermined normal state and the predetermined abnormal state.

* * * * *